US012600875B2

(12) United States Patent
Miyake et al.

(10) Patent No.: US 12,600,875 B2
(45) Date of Patent: Apr. 14, 2026

(54) OIL-BASED INK COMPOSITION FOR BALLPOINT PENS AND BALLPOINT PEN EMPLOYING THE SAME

(71) Applicant: KABUSHIKI KAISHA PILOT CORPORATION, Tokyo-to (JP)

(72) Inventors: Takahito Miyake, Tokyo-to (JP); Chinatsu Shinozaki, Tokyo-to (JP)

(73) Assignee: KABUSHIKI KAISHA PILOT CORPORATION, Tokyo-To (JP)

( * ) Notice: Subject to any disclaimer, the term of this patent is extended or adjusted under 35 U.S.C. 154(b) by 965 days.

(21) Appl. No.: 17/772,796

(22) PCT Filed: Oct. 28, 2020

(86) PCT No.: PCT/JP2020/040388

§ 371 (c)(1),
(2) Date: Apr. 28, 2022

(87) PCT Pub. No.: WO2021/085457

PCT Pub. Date: May 6, 2021

(65) Prior Publication Data

US 2022/0363926 A1 Nov. 17, 2022

(30) Foreign Application Priority Data

Oct. 30, 2019 (JP) ................................ 2019-197438

(51) Int. Cl.
*C09D 11/18* (2006.01)
*C09D 11/17* (2014.01)

(52) U.S. Cl.
CPC .............. *C09D 11/18* (2013.01); *C09D 11/17* (2013.01)

(58) Field of Classification Search
CPC ...................................................... C09D 11/18
See application file for complete search history.

(56) References Cited

U.S. PATENT DOCUMENTS

2014/0299015 A1 10/2014 Ichikawa
2018/0127609 A1* 5/2018 Nakamura .............. C07C 39/16

FOREIGN PATENT DOCUMENTS

EP 1 457 537 9/2004
EP 1 457 538 9/2004
EP 3 042 942 7/2016
(Continued)

OTHER PUBLICATIONS

English machine translation of Itabashi (JP 2009-29880) (Year: 2009).*
(Continued)

*Primary Examiner* — Michael F Pepitone
(74) *Attorney, Agent, or Firm* — WENDEROTH, LIND & PONACK, L.L.P.

(57) ABSTRACT

[Problem]
To provide an oil-based ink composition for ballpoint pens and also an oil-based ballpoint pen employing the composition. The ink composition inhibits a ball seat from wearing under high pen pressure (writing load: 300 to 500 gf), improves writing feeling, and is excellent in writing performance at the beginning of handwriting, in temporal stability and in ink followability.
[means to solve the problem]
An oil-based ink composition for ballpoint pens, comprising a colorant, an organic solvent, and a polyoxy-alkylene glyceryl ether.

15 Claims, 1 Drawing Sheet

(56) References Cited

FOREIGN PATENT DOCUMENTS

| | | | | |
|---|---|---|---|---|
| JP | 5-331403 | | | 12/1993 |
| JP | 6-247093 | | | 9/1994 |
| JP | 6-248215 | | | 9/1994 |
| JP | 6-248216 | | | 9/1994 |
| JP | 7-196971 | | | 8/1995 |
| JP | 2004-83881 | | | 3/2004 |
| JP | 2007-176995 | | | 7/2007 |
| JP | 2008-88264 | | | 4/2008 |
| JP | 2009029880 | A | * | 2/2009 |
| JP | 2012-12592 | | | 1/2012 |
| JP | 2012012592 | A | * | 1/2012 |
| JP | 2012-246431 | | | 12/2012 |
| JP | 2014-24950 | | | 2/2014 |
| JP | 2017-94629 | | | 6/2017 |
| JP | 2017094629 | A | * | 6/2017 |
| JP | 2018034443 | A | * | 3/2018 |
| JP | 2018-65917 | | | 4/2018 |
| JP | 2018-184571 | | | 11/2018 |
| WO | 2013/061753 | | | 5/2013 |
| WO | 2014/002292 | | | 1/2014 |

OTHER PUBLICATIONS

English machine translation of Morimoto et al. (JP 2012-12592) (Year: 2012).*

English machine translation of Iizuka (JP 2018-34443) (Year: 2018).*

English machine translation of Fujii (JP 2017-94629) (Year: 2017).*

Extended European Search Report issued Oct. 25, 2023 in corresponding European Patent Application No. 20882563.8.

International Search Report (ISR) issued Dec. 22, 2020 in International (PCT) Application No. PCT/JP2020/040388.

International Preliminary Report on Patentability and Written Opinion of the International Searching Authority issued May 3, 2022 in International (PCT) Application No. PCT/JP2020/040388.

* cited by examiner

OIL-BASED INK COMPOSITION FOR BALLPOINT PENS AND BALLPOINT PEN EMPLOYING THE SAME

CROSS REFERENCE TO RELATED APPLICATIONS

This application is a U.S. national stage application of International Application No. PCT/JP2020/040388 filed Oct. 28, 2020, which claims priority to Japan Patent Application No. 2019-197438 filed on Oct. 30, 2019, each of which is incorporated by reference herein in its entirety.

TECHNICAL FIELD

The present invention relates to an oil-based ink composition for ballpoint pens and also an oil-based ballpoint pen employing the composition.

BACKGROUND ART

A ballpoint pen has a structure containing a ballpoint tip and an ink storage cylinder fitted with the tip. The ballpoint tip comprises a metal tip body made of, for example, stainless steel, and the tip body is provided with a ball seat on which an ink-transferring ball is held. When handwriting is made with the ballpoint pen, writing feeling thereof tends to be affected by writing resistance between the pen point and a surface to be written on. In fact, when the ballpoint pen is used to write with, the ball is rotated to cause wear on the ball seat and the wear often induces blurring and/or line-skipping in handwriting and also impairs the writing feeling.

In addition, when a lubricant is newly introduced into an ink composition, the temporal stability of the composition may be affected according to affinity between the lubricant and other ingredients of the composition.

Further, if the pen point is left exposed to the air, a solvent or the like in the ink may be evaporated to dry and solidify some ingredients such as a colorant and a resin, and consequently blurring is often caused at the beginning of handwriting.

In order to solve the above problems, many oil-based ink compositions for ballpoint pens have been proposed. They employ various lubricants with which lubricity is intended to be improved and thereby to reduce the writing resistance between the pen point and a surface to be written on when handwriting is made.

Examples of the oil-based ballpoint pen ink compositions incorporated with additives are as follows: "oil-based ballpoint pen ink" disclosed in Patent document 1, which adopts alkyl-β-D-glucoside; "oil-based ink composition for ballpoint pens" disclosed in Patent document 2, which adopts polyethylene glycol having an average molecular weight of 200 to 4000000; "oil-based ink for ballpoint pens" disclosed in Patent document 3, which adopts N-acylamino acid, N-acyl-methyltauric acid and N-acylmethylalanine; and "oil-based ink composition for ballpoint pens" disclosed in Patent document 4, which contains deca macadamia nut oil fatty acid decaglyceryl and at least one polyoxyethylene alkyl ether in which the alkyl group has 16 or more carbon atoms and which is in solid state at room temperature.

PRIOR ART DOCUMENTS

Patent Documents

[Patent document 1] Japanese Patent Laid-Open No. H5-331403

[Patent document 2] Japanese Patent Laid-Open No. H7-196971

[Patent document 3] Japanese Patent Laid-Open No. 2007-176995

[Patent document 4] Japanese Patent Laid-Open No. 2008-88264

DISCLOSURE OF INVENTION

Problem to be Solved by the Invention

Although various additives such as those in Patent documents 1 to 4 can reduce the writing resistance to a certain degree between the pen point and a surface to be written on, the reduction is insufficient and there is still room for improvement.

Further, for the purpose of improving writing feeling, recent oil-based ballpoint pen inks have been made to have low viscosities. Accordingly, when high pen pressure (writing load: 300 to 500 gf) is applied for writing (namely, in high pressure-resistant writing), the lubricity tends to be impaired so that the ball seat may be getting worn down. As a result, writing performance is often deteriorated. In view of that, the lubricity is required to be further enhanced so as to further reduce the writing resistance between the pen point and a surface to be written on and thereby to improve performance in high pressure-resistant writing.

Furthermore, in the case of a retractable ballpoint pen such as a knock-type one or a twist-type one, the pen point is kept exposed to the air and hence writing performance at the beginning of handwriting is liable to be impaired. Accordingly, it is particularly important to ensure the writing performance.

In consideration of the above problems, it is necessary to sufficiently improve both the lubricity under high pen pressure (writing load: 300 to 500 gf) and the writing performance at the beginning of handwriting.

It is an object of the present invention to provide an oil-based ink composition for ballpoint pens and a ballpoint pen employing the composition. The objective ink composition inhibits the ball seat form wearing down under high pen pressure (writing load: 300 to 500 gf), improves the writing feeling, ensures good writing performance at the beginning of handwriting, has excellent temporal stability, and exhibits satisfying ink followability.

Means for Solving Problem

To cope with the above problems, the present invention implements the following constitutions:

1. an oil-based ink composition for ballpoint pens, comprising a colorant, an organic solvent, and a polyoxyalkylene glyceryl ether;
2. the ink composition according to the above 1, wherein said colorant is a pigment;
3. the ink composition according to the above 1 or 2, wherein said polyoxyalkylene glyceryl ether is contained in an amount of 0.1 to 40 mass % based on the total mass of the ink composition;
4. the ink composition according to any one of the above 1 to 3, wherein said organic solvent is an aromatic alcohol:
5. the ink composition according to any one of the above 1 to 4, further comprising a surfactant;
6. the ink composition according to the above 5, wherein said surfactant is a nonionic surfactant;

7. the ink composition according to the above 6, wherein said nonionic surfactant is selected from the group consisting of fatty acid esters, polyalkylene alkyl ethers, polyoxyethylene alkyl amines, alkyl imidazolines, alkyl alkanol amides, and mixtures thereof;
8. the ink composition according to the above 5, wherein said surfactant is an anionic surfactant;
9. the ink composition according to the above 5, wherein said surfactant is a combination of nonionic and anionic surfactants;
10. the ink composition according to any one of the above 1 to 9, which has a viscosity of 30000 mPa·s or less at 20° C. at a shear velocity of 5 $sec^{-1}$;
11. an oil-based ballpoint pen having an ink storage cylinder and a ballpoint tip which is fitted in the tip-side end of the cylinder and which rotatably holds a ball, wherein said ink storage cylinder contains an oil-based ink composition comprising a colorant, an organic solvent, and a polyoxyalkylene glyceryl ether.
12. the oil-based ballpoint pen according to the above 11, wherein said ball has a surface whose arithmetic average roughness (Ra) is 0.1 to 12 nm;
13. the oil-based ballpoint pen according to the above 11 or 12, whose ink consumption per 100 m is 20 to 150 mg; and
14. the oil-based ballpoint pen according to any one of the above 11 to 13, said ball in said ballpoint tip moves in the longitudinal direction in the range of 3 to 30 μm.

Effect of Invention

In the present invention, lubricity is improved enough to ensure smoothness between the pen point and a surface to be written on (and also smoothness between the ball and the tip body) and thereby to reduce writing resistance at the pen point. Because of that, the present invention can make it possible to obtain an oil-based ballpoint pen ink composition which inhibits the ball seat form wearing down under high pen pressure (writing load: 300 to 500 gf), which improves the writing feeling, which ensures good writing performance at the beginning of handwriting, which has excellent temporal stability and which exhibits satisfying ink followability; and also to obtain an oil-based ballpoint pen employing the composition.

DETAILED DESCRIPTION

Figure 1:
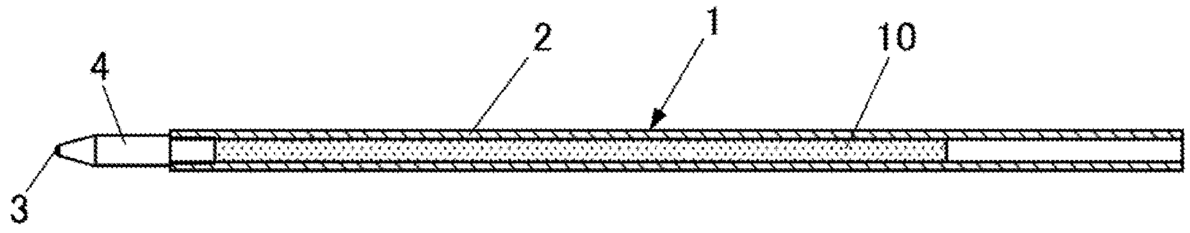
FIG. 1 is a schematic sectional view illustrating a ballpoint pen refill used in an embodiment of the present invention.

Embodiments of the present invention will be described below in detail. In the present specification, unless otherwise noted, the "part(s)", "% (percent)" and "ratio(s)" in the description of blending amount are in terms of mass, and the "content" means a mass percent (mass %) of the ingredient based on the total mass of the ink composition.

The present invention is characterized by an oil-based ballpoint pen ink composition comprising a polyoxyalkylene glyceryl ether. The composition forms a lubricant layer containing the polyoxyalkylene glyceryl ether, and the layer keeps smoothness between the pen point and a surface to be written on (and also smoothness between the ball and the tip body) and thereby reduces writing resistance at the pen point. Because of that, it becomes possible to inhibit the ball seat form wearing down under high pen pressure (writing load: 300 to 500 gf) and to improve the writing feeling. Further, even if the pen point is left exposed to the air, the solvent in the ink is prevented from evaporating so as to improve writing performance at the beginning of handwriting and to inhibit precipitates from depositing in the ink. Thus, temporal stability of the ink composition (hereinafter, simply referred to as "temporal stability") can be improved. In this way, the invention makes it possible to inhibit the ball seat form wearing down under high pen pressure (writing load: 300 to 500 gf) and, at the same time, to improve all of the writing feeling, the writing performance at the beginning of handwriting and the temporal stability.

(Polyoxyalkylene Glyceryl Ether)

The polyoxyalkylene glyceryl ether adopted in the present invention is synthesized by addition polymerization of glycerin or polyglycerin with alkylene oxide. Examples thereof include: polyoxyalkylene glyceryl ethers, polyoxyalkylene diglyceryl ethers, and poly-oxyalkylene triglyceryl ethers.

A compound of polyoxyalkylene glyceryl ether contains an alkylene oxide in its structure, and has hydrophilicity and lipophilicity. The compound has a hydrophilic group of high polarity in its structure, and is hence easy to adsorb on metal material of the ballpoint tip. In this way, the polyoxyalkylene glyceryl ether can enhance lubricity enough to inhibit the ball seat form wearing down even under high pen pressure (writing load: 300 to 500 gf) and to improve the writing feeling.

Further, polyoxyalkylene glyceryl ethers generally have low volatility. Because of that, even if the pen point is left exposed to the air, writing performance at the beginning of handwriting can be improved. In addition, ink viscosity of the oil-based ink composition for ballpoint pens can be prevented from increasing as much as possible, so as to improve ink followability. In the case where a pigment is used as the colorant, the pigment generally forms aggregates and thereby tends to increase the ink viscosity as time elapses to lower the ink followability. However, the polar group in the polyoxyalkylene glyceryl ether adsorbs on the surface of the pigment so that the pigment can be stably dispersed in the oil-based ink. Accordingly, the pigment is prevented from aggregating and hence the ink viscosity is kept from increasing. As a result, the ink followability can be improved.

The "polyoxyalkylene glyceryl ether" here includes polyoxyethylene glyceryl ether and polyoxypropylene glyceryl ether. Among them, because of propylene groups, polyoxypropylene glyceryl ether is excellent in lipophilicity and inhibits the ink composition from absorbing moisture and therefore tends to improve the temporal stability. In view of that, polyoxypropylene glyceryl ether is preferably adopted.

The average of alkylene oxide addition molar number (average addition molar number of alkylene oxide) in the polyoxyalkylene glyceryl ether is preferably 1 to 50 in consideration that the ether inhibits the ball seat form wearing down under high pen pressure (writing load: 300 to 500 gf), improves the writing feeling, advances the writing performance at the beginning of handwriting, and prevents moisture absorption to enhance the temporal stability. Further, particularly considering the prevention of moisture absorption for enhancing the temporal stability, the average addition molar number of alkylene oxide is preferably 1 to 30. Furthermore, in consideration of the wearing inhibition of the ball seat under high pen pressure, of the writing feeling improvement, of the advance on the writing performance at the beginning of handwriting, and of the enhancement of the temporal stability, the average addition molar number of alkylene oxide is preferably 1 to 20, more preferably 5 to 20.

Particularly considering the wearing inhibition of the ball seat under high pen pressure, the average addition molar number of alkylene oxide is preferably 1 to 30, more preferably 1 to 20, further preferably 5 to 20, furthermore preferably 1 to 12, yet further preferably 5 to 12. The structure of polyoxyalkylene glyceryl ether is preferably represented by the following formula (1) or (2) because the effects of the present invention are significantly achieved.

(1)

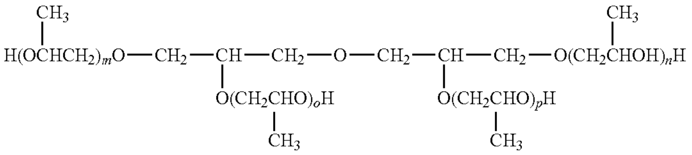

(2)

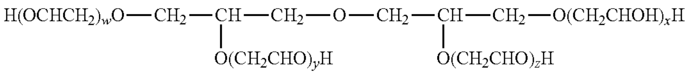

In the formulas, each of m, n, o, p, w, x, y and z is independently a number indicating the addition molar number of alkylene oxide.

It is noted that the number of m+n+o+P is an average addition molar number of propylene oxide and that the number of w+x+y+z is an average addition molar number of ethylene oxide.

Among the above, polyoxyalkylene glyceryl ethers represented by the formula (1) are preferred because they provide significant improvement of temporal stability.

The polyoxyalkylene glyceryl ether preferably has a weight average molecular weight of 5000 or less. If it is too large, the temporal stability tends to be adversely affected and the ink composition tends to have such a high viscosity as to adversely affect the ink followability. More considering the temporal stability and the ink followability, the weight average molecular weight is preferably 3000 or less, further preferably 1500 or less, furthermore preferably 1200 or less. On the other hand, considering the wearing inhibition of the ball seat under high pen pressure, it is preferably 900 or less. However, if being too small, the weight average molecular weight tends to adversely affect the wearing inhibition of the ball seat under high pen pressure, the writing performance at the beginning of handwriting and dispersibility of the pigment. In view of that, it is preferably 300 or more. More considering the wearing inhibition of the ball seat under high pen pressure, the weight average molecular weight is 500 or more.

The weight average molecular weight is obtained by GPC (gel permeation chromatography) in terms of polystyrene-reduced value.

The polyoxyalkylene glyceryl ether has a solubility parameter (SP value) of preferably 16 to 30, more preferably 16 to 27 considering the wearing inhibition of the ball seat under high pen pressure, the writing performance at the beginning of handwriting and the temporal stability.

The ink composition contains the polyoxyalkylene glyceryl ether in an amount of preferably 0.1 to 40 mass %, more preferably 3 to 30 mass % based on the total mass of the ink composition. If the content thereof is less than 0.1 mass %, there is a fear that the composition cannot have effects of inhibiting the ball seat form wearing down under high pen pressure, of improving the writing feeling, of advancing the writing performance at the beginning of handwriting and of ensuring the ink followability. On the other hand, if the content is more than 40 mass %, the temporal stability may be adversely affected. Considering the balance between the temporal stability and the wearing inhibition of the ball seat, the content is preferably 5 to 25 mass %, more preferably 8 to 25 mass %.

(Organic Solvent)

As the organic solvent used in the present invention, organic solvents generally adopted in known oil-based ball-point pen inks are employable. Examples thereof include: glycol ether solvents, such as, ethylene glycol monoethyl ether, ethylene glycol monobutyl ether, ethylene glycol dimethyl ether, ethylene glycol monophenyl ether, propylene glycol monomethyl ether, propylene glycol monoethyl ether, diethylene glycol dimethyl ether, 3-methoxy butanol, 3-methoxy-3-methyl butanol; glycol solvents, such as, diethylene glycol, triethylene glycol, polyethylene glycol, propylene glycol, dipropylene glycol, butylene glycol, and ethylene glycol; and alcohol solvents, such as, benzyl alcohol, methanol, ethanol, 1-propanol, 2-propanol, iso-propanol, iso-butanol, t-butanol, propargyl alcohol, allyl alcohol, 3-methyl-1-butyne-3-ol, ethylene glycol monomethyl ether acetate, and other higher alcohols.

Among the above organic solvents, aromatic alcohols are preferably adopted because they improve the lubricity by the action of aromatic groups and have such high compatibility with the polyoxyalkylene glyceryl ether as to enhance the solution stability.

Meanwhile, glycol ether solvents have appropriate hygroscopicity for keeping sufficient moisture of a film formed when the tip point is dried, and hence can easily soften the film so as to improve the writing performance at the beginning of handwriting. Accordingly, they can achieve further favorable effects in combination with the polyoxyalkylene glyceryl ether. In consideration of stability in the ink composition, aromatic glycol ether solvents are preferably employed.

In view of improving the solubility and the lubricity and of drying handwriting, the content of the organic solvent is preferably 10 to 90 mass %, more preferably 20 to 90 mass %, particularly preferably 40 to 70 mass %, based on the total mass of the ink composition.

(Colorant)

There are no particular restrictions on the colorant used in the present invention, and it can be appropriately selected from dyes and pigments, which can be used in combination. Examples of the dyes include: oil soluble dyes, acidic dyes, basic dyes, and premetallized dyes. In addition, salt dyes of those dyes are also usable. Examples thereof include: salt dyes of acidic dyes and basic dyes, of basic dyes and organic acids, and of acidic dyes and organic amines. Those dyes can be used singly or in combination of two or more.

In view of the lubricity, pigments are preferably adopted as the colorant. That is because particles of the pigment tend to penetrate into the gap between the ball and the tip body and to act as bearings so that they can inhibit direct contact between the metal elements. As a result, they tend to enhance the lubricity, improve the writing feeling and inhibit the ball seat form wearing down. Further, also because being excellent in water resistance, in light stability and in color appearance, pigments are preferred. The pigment is preferably selected from, for example, carbon black, quinacridone pigments, threne pigments, or diketo-pyrrolopyrrole pigments.

Furthermore, in view of the temporal stability, carbon black or diketopyrrolopyrrole pigments are preferably employed.

There are some kinds of pigments, such as, inorganic, organic and processed pigments. Examples thereof include: carbon black, aniline black, ultramarine, chrome yellow, titanium oxide, iron oxide, phtharo-cyanine pigments, azo pigments, quinacridone pigments, diketopyrrolopyrrole pigments, quinophthalone pigments, threne pigments, triphenylmethane pigments, perinone pigments, perylene pigments, dioxazine pigments, metallic pigments, pearl pigments, fluorescent pigments, and phosphorescent pigment.

Particles of those pigments have bearing action, which cooperatively works with a lubricant layer formed by the polyoxyalkylene glyceryl ether and a nonionic or anionic surfactant (particularly, a phosphoric ester surfactant) to create a synergistic effect that makes it easy for the above pigments to keep the lubricity and, as a result, to improve the writing feeling and the wearing inhibition of the ball seat. The mean particle size of the pigment is preferably 1 to 500 nm, more preferably 30 to 350 nm, further preferably 50 to 300 nm in view of flow paths of the ink composition and gaps among the members in the ballpoint tip. Here, the mean particle size can be obtained according to the laser diffraction method. Specifically, the particle size distribution is measured with a laser diffraction particle size analyzer (Microtrac HRA9320-X100 [trademark], manufactured by Nikkiso Co., Ltd.) and calibrated by use of a standard sample or other measurement methods. In the obtained particle size distribution, the particle size (D50) at accumulation volume of 50% is determined and regarded as the mean particle size.

The particle size is preferably measured while the pigment particles are in the state of dispersion. That is because the pigment plays the above role in the oil-based ballpoint pen ink composition while the particles thereof are dispersed.

Further, because being excellent in water resistance, in light stability, in color appearance and in handwriting durability, pigments are preferred. Considering pigments have excellent water resistance and light stability and also provide lubricity, the colorant contained in the oil-based ballpoint pen composition comprises pigments preferably in a large amount. Specifically, if the ratio of the content of the pigments to that of the colorant is 10 mass % or more, the water resistance, light stability and lubricity can be improved to the required level. However, in order to further improve the water resistance and light stability so that the handwriting may be hardly changed, the pigment content in the colorant is preferably 70 mass % or more, further preferably 90 mass % or more, particularly preferably 100 mass %.

In general, ink compositions containing pigments tend to be impaired in writing performance at the beginning of handwriting and in ink followability when the penpoint is dried. However, since comprising a polyoxyalkylene glyceryl ether, the ink composition of the invention can keep satisfying writing performance at the beginning of handwriting and good ink followability even if containing a high content of the pigment.

In the case where dyes are adopted as the colorant, salt dyes are preferably employed because they enhance the temporal stability in combination with the polyoxyalkylene glyceryl ether. The salt dye is preferably selected from salt dyes of acidic dyes and basic dyes, salt dyes of basic dyes and organic acids, or salt dyes of acidic dyes and organic amines because they have such highly stable salt bonds as to further enhance the temporal stability. Considering stability of the combination with other ingredients of the ink composition, salt dyes of basic dyes and organic acids are preferred.

The content of the colorant is preferably 3.0 to 40.0 mass %, more preferably 5.0 to 30.0 mass % based on the total mass of the ink composition. If the content is too small, it is often difficult to obtain deep-colored handwriting. If the content is too large, the colorant tends to have insufficient dissolution stability in the ink composition. The content of the colorant is preferably 7.0 to 25.0 mass %, more preferably 10.0 to 20.0 mass % based on the total mass of the ink composition.

(Surfactant)

The ink composition according to the invention preferably comprises a surfactant. That is because the surfactant can soften a film formed on the pen point by resins or the like contained in the ink composition and hence tends to improve the writing performance at the beginning of handwriting. Further, the surfactant can enhance the lubricity to improve writing feeling. There are some kinds of surfactants, such as, nonionic, anionic and cationic surfactants. Among them, nonionic surfactants are preferred because they can enhance the temporal stability. That is because, since being nonionic, they inhibit other ingredients in the ink composition from precipitating.

In consideration of the temporal stability, the nonionic surfactants have HLB values of preferably 16 or less, more preferably 3 to 14, particularly preferably 3 to 11. The HLB value can be obtained, for example, by Griffin's method.

Unlike cap-type ballpoint pens, retractable ballpoint pens such as knock-type ones and twist-type ones have pen points always exposed to the air. Accordingly, those pen points are liable to be dried. The surfactants having HLB values in the above range can solve that problem, and hence are more preferably employed.

Examples of the nonionic surfactants include: fatty acid esters, polyalkylene alkyl ethers, polyoxyethylene alkyl amines, alkyl imidazolines, alkyl alkanol amides, oxyethylene oxypropylene block copolymers, and acetylene bond-containing surfactants. Among them, in consideration of the temporal stability and the writing performance at the beginning of handwriting, it is preferred to select at least one from the group consisting of fatty acid esters, polyalkylene alkyl ethers, polyoxyethylene alkyl amines, alkyl imidazolines, and alkyl alkanol amides. Further, particularly considering improvement of the writing performance at the beginning of handwriting, fatty acid esters are preferably adopted. Those surfactants can be used singly or in combination of two or more.

Examples of the fatty acid esters include: sorbitan fatty acid esters, polyoxyethylene sorbitan fatty acid esters, fatty acid esters, glycerol fatty acid esters, polyglycerol fatty acid esters, and polyoxyethylene fatty acid esters. Among them, it is preferred to select at least one from the group consisting of sorbitan fatty acid esters, polyoxyethylene sorbitan fatty acid esters, glycerol fatty acid esters and alkyl imidazolines. That is because they interact with the polyoxyalkylene glyceryl ether to improve the writing performance at the beginning of handwriting. Further, those having cyclic skeletons, such as, sorbitan fatty acid esters, polyoxyethylene sorbitan fatty acid esters and alkyl imidazolines, are preferably employed. Furthermore, considering that fatty acid esters having plural hydroxide groups can appropriately keep moisture of a film formed on the pen point, it is preferred to select at least one from the group consisting of sorbitan fatty acid esters and polyoxyethylene sorbitan fatty acid esters.

In consideration of the writing performance at the beginning of handwriting, the sorbitan fatty acid esters preferably contain alkyl groups having 1 to 20 carbon atoms. Further considering that the wearing inhibition of the ball seat under high pen pressure tends to be improved when the sorbitan fatty acid esters have lengths appropriate for forming a lubricant layer, the alkyl groups contained therein have preferably 10 to 20, more preferably 12 to 18 carbon atoms.

Examples of the sorbitan fatty acid esters include: sorbitan fatty acid esters, such as, sorbitan monolaurate, sorbitan monopalmitate, sorbitan monostearate, sorbitan monooleate, sorbitan monococoate, sorbitan dilaurate, sorbitan distearate, sorbitan dioleate, sorbitan trioleate, sorbitan tristearate and complexes thereof; and polyoxyethylene sorbitan fatty acid esters, such as, polyoxyethylene sorbitan monolaurate, polyoxyethylene sorbitan monopalmitate, polyoxyethylene sorbitan monostearate, polyoxyethylene sorbitan trioleate, polyoxyethylene sorbitan tristearate and complexes thereof.

The content of the nonionic surfactant is preferably 0.1 to 15 mass % based on the total mass of the ink composition. If the content is less than 0.1 mass %, it is difficult to obtain desired wearing inhibition of the ball seat under high pen pressure (writing load: 300 to 500 gf) and to improve the writing feeling, the writing performance at the beginning of handwriting and the ink followability. However, if it is more than 15 mass %, the temporal stability tends to be impaired. In consideration of those tendencies, the content is preferably 0.5 to 10 mass %, more preferably 1 to 5 mass % based on the total mass of the ink composition.

Considering further improvements of the lubricity at the pen point (lubricity between the ball and the ball seat), of the writing feeling and of the writing performance at the beginning of handwriting when the pen point is dried, the composition preferably comprises an anionic surfactant. Examples of the anionic surfactant include phosphate ester surfactants. Further in consideration of keeping both the temporal stability and the lubricity favorable, it is preferred to adopt both the nonionic surfactant and the anionic surfactant in combination.

Phosphate ester surfactants easily adsorbed on metal surfaces because of phosphate groups, and hence particularly they can form a lubricant layer between the ball and the ball seat and consequently can improve the lubricity and the writing feeling. Therefore, when the phosphate ester surfactant is used in combination with the polyoxyalkylene glyceryl ether, their lubricating actions synergistically work between the ball and the ball seat to further improve the lubricity between them and consequently to realize smooth writing feeling. In addition, the phosphate ester surfactant also has an effect of improving the writing performance at the beginning of handwriting. Accordingly, if used in combination with the polyoxyalkylene glyceryl ether, the phosphate ester surfactant can further improve the writing performance at the beginning of handwriting.

Further, the phosphate ester surfactant still also has an antirust effect. Accordingly, if the ball is made of metal, the phosphate ester surfactant is preferred because it prevents the ball from corroding and thereby keeps good writing feeling and inhibits the ball seat from wearing away. In the case where the ball is made of an alloy containing cobalt, nickel, chromium or the like, the phosphate ester surfactant is particularly preferred because the antirust effect thereof makes those metals tend to hardly suffer from corrosion even as time elapses. This tendency is particularly remarkable when the ball is made of cemented carbide containing tungsten carbide as the main ingredient and cobalt, nickel, chromium or the like as the binder ingredient. Accordingly, the phosphate ester surfactant is preferred in that case.

For the above reasons, in the present invention, it is effective to employ an anionic surfactant, particularly a phosphate ester surfactant in combination with the polyoxyalkylene glyceryl ether.

The ink composition of the invention may further comprise polyvinyl butyral, which has an effect of improving the lubricity. If polyvinyl butyral is employed in combination with a phosphate ester surfactant, the improvement effect given by the polyvinyl butyral and that given by the anionic surfactant, particularly, by the phosphate ester surfactant synergistically work to further promote the lubricity. That combination is therefore preferred.

Both the lubricity and the writing performance at the beginning of handwriting can be further improved by interaction between the phosphate ester surfactant and the polyoxyalkylene glyceryl ether. In view of that, the phosphate ester surfactant has a HLB value of preferably 6 to 18, more preferably 6 to 14. If the HLB value is more than 18, the hydrophilicity tends to be so large that the surfactant may often have poor solubility in the oil-based ink composition and hence that it may be often difficult to obtain the effects, particularly, the lubricating effect of the phosphate ester surfactant. On the other hand, if the HLB value is less than 6, the lipophilicity is so large that the compatibility with the organic solvent may be adversely affected, that the temporal stability may be difficult to obtain and that it may be hard to improve the writing performance at the beginning of handwriting. Further, considering the lubricity, the HLB value is preferably 17 or less, more 12 or less. Accordingly, the HLB value is preferably 6 to 17, more preferably 6 to 12. Furthermore, also considering the writing performance at the beginning of handwriting, the HLB value is preferably 7 to 17, more preferably 7 to 12. When used in retractable ballpoint pens such as knock-type ones and twist-type ones, the ink composition particularly preferably comprises a phosphate ester surfactant having a HLB value in the above range so as to improve the writing performance at the beginning of handwriting. That is because retractable ballpoint pens have pen points which are always exposed to the air and hence which are liable to be dried. The HLB value can be obtained, for example, by Griffin's method or Kawakami's method.

Examples of the phosphate ester surfactant include: phosphate esters having alkoxy groups ($C_aH_{2a+1}O$), phosphate monoesters of polyoxyethylene alkyl ethers or of polyoxyethylene alkylaryl ethers, phosphate diesters of polyoxyethylene alkyl ethers or of polyoxyethylene alkylaryl ethers, phosphate triesters of polyoxyethylene alkyl ethers or of polyoxyethylene alkylaryl ethers, alkyl phosphate esters, alkyl ether phosphate esters, and derivatives thereof.

Among the above, considering the wearing inhibition of the ball seat under high pen pressure (writing load: 300 to 500 gf), it is preferred to use a phosphate ester surfactant having an alkyl group. The alkyl group has preferably 8 to 18, more preferably 10 to 18, further preferably 12 to 18 carbon atoms. If the alkyl group has too small a number of carbon atoms, the lubricity tends to be poor. On the other hand, if it has too large a number of carbon atoms, the temporal stability tends to be adversely affected.

In the case where the ink composition comprises a phosphate ester surfactant, the surfactant has an acid value of preferably 200 (mgKOH/g) or less, more preferably 170 (mgKOH/g) or less, further preferably 150 or less. That acid value makes it easy for the phosphate ester surfactant to improve the lubricity. Further, considering both the stability in the ink composition and the lubricity, the acid value is preferably 30 to 170 (mgKOH/g), more preferably 40 to 160 (mgKOH/g), further preferably 70 to 120 (mgKOH/g).

The "acid value" here means the number of milligrams (mg) of potassium hydroxide necessary for neutralizing acidic ingredients contained in 1 g of the sample.

In the case where the ink composition according to the invention comprises a surfactant, particularly, the above-described nonionic surfactant and/or phosphate ester surfactant, the blending ratio by mass of the polyoxyalkylene glyceryl ether represented by the above formula (1) or (2) to the surfactant (i.e., ratio of polyoxyalkylene glyceryl ether/surfactant) is preferably 1 to 40, more preferably 2 to 30, further preferably 1 to 25, furthermore preferably 1 to 20, still further preferably 1 to 15, still furthermore preferably 2 to 15, and most preferably 5 to 10. That is because the blending ratio in the above range makes it possible to improve the wearing inhibition of the ball seat, the writing feeling, the writing performance at the beginning of handwriting and the ink followability in well balance.

(Organic Amine)

The ink composition of the present invention preferably contains an organic amine so as to improve stabilities of the ingredients contained therein. As the organic amine, for example, aliphatic amines can be employed. Examples of the aliphatic amines include: ethylene oxide-containing amines, such as, oxyethylene alkyl amines and polyoxyethylene alkyl amine; alkyl amines, such as, lauryl amine and stearyl amine; and dimethyl alkyl amines, such as, distearyl amine, dimethyl lauryl amine, dimethyl stearyl amine, and dimethyl octyl amine. Among them, ethylene oxide-containing amines and dimethyl alkyl amines are preferred. Further, particularly considering the wearing inhibition of the ball seat under high pen pressure (writing load: 300 to 500 gf), ethylene oxide-containing amines are preferred.

In consideration of stability with the afore-mentioned ingredients such as the surfactant and the colorant, the organic amine preferably has a total amine value of 100 to 300 (mgKOH/g). If it is more than 300, the reactivity is so strong that the amine easily reacts with the above ingredients and accordingly that the temporal stability tends to be impaired. However, if it is less than 100, the surfactant tends to be unstable in the ink composition and consequently the resultant oil-based ballpoint pen tends to have poor lubricant performance. Considering the stability with the above ingredients and the lubricity, the total amine value is preferably in the range of 150 to 300 (mgKOH/g). On the other hand, particularly considering the stability, the total amine value is preferably 180 to 300 (mgKOH/g), more preferably 230 to 270 (mgKOH/g).

In the present invention, the "total amine value" indicates the total amount of primary, secondary and tertiary amines and means the number of milligrams (mg) of potassium hydroxide equivalent to hydrochloric acid necessary for neutralizing 1 g of the sample.

As for the reactivity with other ingredients in the ink composition, primary amins are the strongest, secondary amins are weaker and tertiary amins are the weakest. Accordingly, considering the temporal stability, secondary or tertiary amines are preferred. They may be used singly or in combination of two or more.

(Resin)

In order to improve ink-leak prevention, resins are preferably used as an ink viscosity modifier. Examples of the resins include: polyvinyl butyral resins, ketone resins, polyacetal resins, polyvinyl alcohol resins, cellulose resins, terpene resins, alkyd resins, phenoxy resins, and polyvinyl acetate resins. Among them, the composition preferably comprises a polyvinyl butyral resin or a ketone resin.

Polyvinyl butyral resins tends to form a lubricant layer giving high lubricating effect. That is because polyvinyl butyral resins form an elastic ink layer between the ball and the ball seat, so that they are hardly in direct contact with each other. As a result, the writing feeling tends to be improved. If a polyvinyl butyral resin is used in combination with the polyoxyalkylene glyceryl ether, the combination gives a synergistic effect that makes it easy to obtain higher lubricating effect. In addition, polyvinyl butyral resins form a film at the penpoint to further improve ink-leak prevention and hence they are also preferred. In the case where pigments are used as the colorant, polyvinyl butyral resins further gives an effect of dispersing the pigment and hence they are still also preferably employed.

Here, the "polyvinyl butyral resin" means a resin obtained by making polyvinyl alcohol (PVA) react with butyl aldehyde (BA), and the resin has a structure containing butyral groups, acetyl groups and hydroxyl groups.

The polyvinyl butyral resin contains hydroxyl groups in an amount of preferably 25 mol % or more. That is because polyvinyl butyral resins containing 25 mol % or more of hydroxy groups have sufficient solubility in organic solvent and largely improve the lubricating effect, the ink-leak prevention and the writing performance at the beginning of handwriting. Further, polyvinyl butyral resins containing 30 mol % or more of hydroxy groups particularly improve the writing feeling and hence are preferred. In general, when a ballpoint pen is used to write with, the ball therein is rotated to generate friction heat and accordingly the ink composition at the tip end is heated and the local viscosity often decreases to impair the writing feeling. However, unlike other resins, polyvinyl butyral resins prevent the ink composition from losing viscosity even if the ink temperature is elevated. In addition, polyvinyl butyral resins form an elastic ink layer between the ball and the ball seat, so that they are hardly in direct contact with each other. Accordingly, polyvinyl butyral resins tends to improve the writing feeling. They are particularly effective for oil-based ballpoint pens, which are often used under high pen pressure. On the other hand, polyvinyl butyral resins containing 40 mol % or less of hydroxy groups are preferred because they have such low hygroscopicity that the temporal stability is hardly impaired. For those reasons, the polyvinyl butyral resin contains hydroxyl groups in an amount of preferably 30 to 40 mol %, more preferably 30 to 36 mol %.

Here, the amount (mol %) of hydroxy groups in a polyvinyl butyral resin means the hydroxy group content (mol %) based on the total molar amount of butyral groups (mol %), acetyl groups (mol %) and hydroxy groups (mol %).

The polyvinyl butyral resin has an average polymerization degree of preferably 200 to 2500, more preferably 1500 or less. If the degree is 200 or more, the resin easily improves ink-leak prevention. On the other hand, if the degree is more than 2500, the ink viscosity tends to be so high that the writing feeling may be adversely affected. Considering that the combination with the polyoxyalkylene glyceryl ether synergistically gives an effect of improving the lubricity, the polyvinyl butyral resin preferably has an average polymerization degree of 200 to 1000. Here, the "average polymerization degree" means the number of fundamental units constituting one molecular of the polyvinyl butyral resin, and it is possible to adopt the value measured according to the method regulated by JIS K6728 (2001 version).

The content of the polyvinyl butyral resin is preferably 50% or more based on the total amount of all resins contained in the oil-based ballpoint pen ink composition, and this means that the polyvinyl butyral resin is preferably used as the main resin. If the content of the polyvinyl butyral resin is less than 50% based on the total amount of all resins, other resins tend to prevent formation of the elastic ink layer and hence it is often difficult to improve the writing feeling. Further, they also tend to prevent formation of a resin film formed at the tip end and hence often make it unable to inhibit ink dripping. Considering tendency of improving the writing feeling and the inhibition of ink dripping, the content of the polyvinyl butyral resin is preferably 70% or more, further preferably 90% or more based on the total amount of all resins.

The content of the resins is preferably 1 to 40 mass % based on the total mass of the ink composition. If it is less than 1 mass %, the resultant composition tends to be poor in the lubricity and in the performance of ink dripping inhibition. If it is more than 40 mass %, the resins tend to have poor solubility in the ink. The content of the resins is more preferably 5 mass % or more. However, if it is more than 30 mass %, the ink viscosity tends to be so high that the writing feeling may be adversely affected. In view of those, the resin content is preferably 5 to 30 mass %, more preferably 6 to 25 mass %, most preferably 6 to 18 mass %.

In addition to the above ingredients, pseudo-plasticizers such as fatty acid amides and hydrogenated castor oil may be adopted as a viscosity modifier. Further, colorant stabilizers, plasticizers, chelating agents and water are optionally employable. They may be used singly or in combination od two or more.

There are no particular restrictions on the viscosity of the oil-based ballpoint pen ink composition according to the invention. However, if being too high, the viscosity tends to impair the writing feeling, the ink followability and the writing performance at the beginning of handwriting. In view of that, the ink viscosity at 20° C. at a shear velocity of 5 $sec^{-1}$ (in static state) is preferably 30000 mPa·s or less. On the other hand, if the viscosity is too low, it is difficult to inhibit ink dripping. In view of that, the viscosity is preferably 500 mPa·s or more, further preferably 1000 mPa·s or more. Considering further improvements of the ink dripping inhibition, the writing feeling, the ink followability and the writing performance at the beginning of handwriting, the ink composition has a viscosity of preferably 500 to 25000 mPa·s, more preferably 800 to 25000 mPa·s, further preferably 1000 to 25000 mPa·s. In consideration of the writing feeling and the writing performance at the beginning of handwriting, the viscosity is preferably 1000 to 2000 mPa·s, more preferably 2000 to 20000 mPa·s. When the writing feeling is intended to be further improved and the ink consumption is increased to obtain deep-colored handwriting, the viscosity is preferably 500 to 10000 mPa·s, more preferably 1000 to 5000mPa·s.

(Oil-Based Ballpoint Pen)

The oil-based ink composition for ballpoint pens according to the present invention can be applied to various oil-based ballpoint pens, but is preferably used in retractable ballpoint pens such as knock-type ones and twist-type ones. In that case, a retractable ballpoint pen comprises a storage cylinder filled with the ink composition of the invention and a ballpoint tip fitted at one end of the cylinder. The ballpoint tip is provided with a ball holder in which a ball is rotatably held. The ballpoint tip is made extendable from and retractable into an end aperture of the shaft tube, and hence this ballpoint pen has a structure generally referred to as "retractable ballpoint pen". When a conventional ink composition is used in a retractable ballpoint pen whose pen point is not tightly closed, the tip end is always left exposed to the air and hence tends to be dried to cause blurring at the beginning of handwriting. However, the composition of the present invention solves that problem and therefore is preferably used.

The following explains a preferred structure of the oil-based ballpoint pen according to the invention.

The oil-based ballpoint pen according to the invention has a storage cylinder filled with the ink composition. The storage cylinder may be either a refill equipped with a tip at one end or a shaft tube equipped with a tip at one end. Since the ink composition of the invention is suitably used in a retractable ballpoint pen, the refill is preferably encased in a shaft tube. FIG. 1 shows a schematic sectional view of a refill usable in the oil-based ballpoint pen of the invention.

The ballpoint pen refill usable in the invention comprise an ink storage cylinder 2 and a ballpoint tip 4 fitted at one end of the cylinder 2. In the ink storage cylinder 2, the ink composition of the invention is contained. At the tip end, a ball 3 is encased.

For example, the ink storage cylinder, in which the ink is contained, is a molding of thermoplastic resin such as polyethylene, polypropylene, polyethylene terephthalate or nylon.

The tip may be connected to the ink storage cylinder directly or through a connecting member.

The space behind the ink in the ink storage cylinder is preferably filled with a backflow preventer, which is non-volatile or hardly-volatile liquid.

Figure 2:
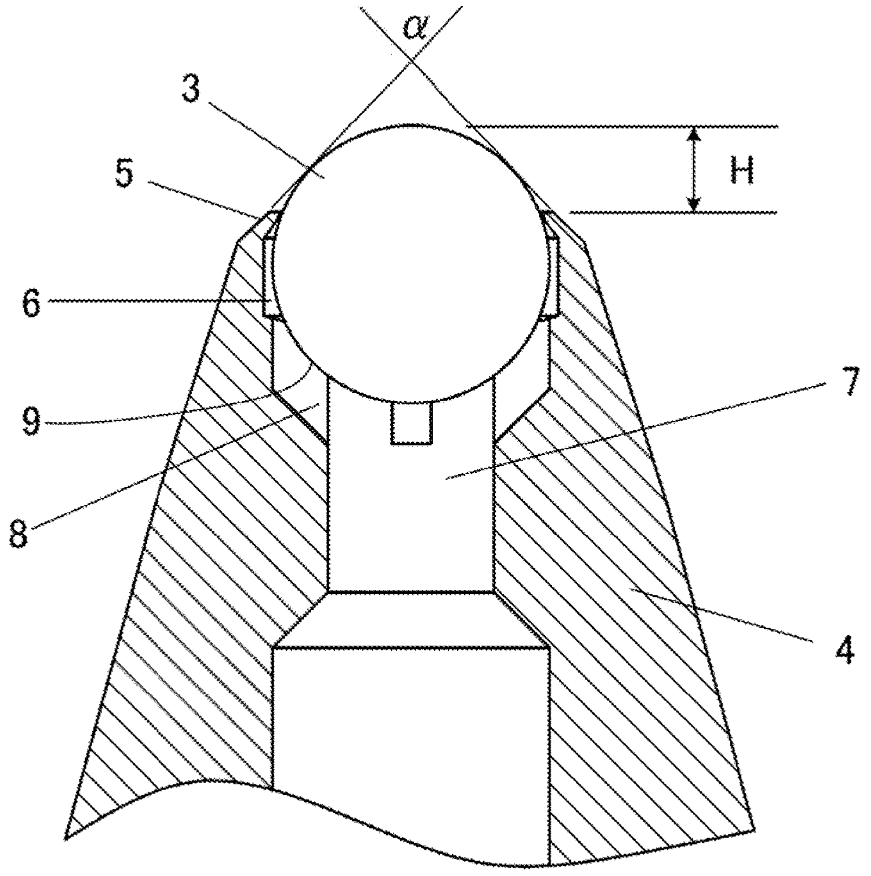
FIG. 2 is a schematic sectional view illustrating a ballpoint tip used in an oil-based ballpoint pen according to an embodiment of the present invention.

The ballpoint tip placed at one end of the refill can be freely selected from generally used tips. FIG. 2 shows a schematic sectional view of a ballpoint tip 4 usable in the oil-based ballpoint pen of the invention.

The ballpoint tip 4 comprises at least a tip body and a ball 3. The tip body is generally made of metal material. For example, the tip body can be produced in the following manner: first a stainless steel wire rod is cut into desired length, then a ball holder 6, an ink-flow port 7 and ink-flow canals 8 radially extending from the ink-flow port 7 are formed, thereafter a ball seat 9 having an almost arc surface is formed on the bottom of the ball holder 6, subsequently the ball 3 is placed on the ball seat 9, and finally the tip end 5 is swaged inward. In this way, the ballpoint tip 4 can be obtained.

The shape of the ballpoint tip influences the writing performance and the like, and hence is appropriately controlled. For example, the ball exposure H, which means how much part of the ball 3 placed on the ball seat 9 is out of the tip end, is generally 10 to 30% based on the ball diameter. Accordingly, the ball exposure H is, for example, 30% of the ball diameter. If the ball exposure is in the above range, it becomes possible to appropriately control the ink consumption per 100 m.

The swaging angle α is 110° or less, preferably 95° or less. If the swaging angle α is too large, the angle between the ballpoint pen and paper tends to be small when the ballpoint pen is used to write with. Accordingly, the writing performance is liable to be adversely affected. On the other hand, if the swaging angle is less than 50°, the gap space between the ball 3 and the edge of the tip end is liable to be small. The small gap space may impair the writing performance because the gap space is filled with ink. In view of that, the swaging angle α is preferably 50° to 110°, more preferably 60° to 95°. Accordingly, the swaging angle α is. for example, 80°.

The ball holder generally has an inner diameter of 101 to 120% of the ball diameter, and hence is, for example, 104% of the ball diameter. The diameter of the ball seat is generally 70 to 95% of the ball diameter, and hence is, for example, 86% of the ball diameter. If the diameters thereof are within the above ranges, it becomes possible to appropriately control the ink consumption per 100 m.

There are no particular restrictions on the material of the ball 3. Examples of the material include: cemented carbide containing tungsten carbide as the main ingredient; metals, such as, stainless steel; ceramics, such as, silicon carbide, silicon nitride, alumina, silica, zirconia, titanium, hafnium, vanadium, niobium, tantalum, chromium, and molybdenum; and ruby. Among them, the ball is preferably made of cemented carbide containing tungsten carbide as the main ingredient because it is hard to break and excellent in processability and in productivity. Further, considering binding stability, it is also preferred to use cemented carbide containing cobalt as the binder ingredient.

In addition, it is possible to use single metals, such as, steel, copper, aluminum, and nickel; and alloys, such as, nickel silver and stainless steel. Further, it is also possible to use carbides, oxides, nitrides, borides and silicides of metals and the like. Examples of the carbides include: carbides of titanium, vanadium, chromium, tantalum, niobium, molybdenum, boron, zirconium, tungsten and silicon. Examples of the oxides include: oxides of aluminum, chromium, magnesium, silicon, beryllium, thorium, titanium, calcium, and zirconium. Examples of the nitrides include: nitrides of titanium, boron, silicon and aluminum. Examples of the borides include: borides of zirconium, chromium, and titanium.

The ball 3 has a diameter of generally 0.25 to 1.6 mm, preferably 0.5 to 1.6 mm, more preferably 0.5 to 1.0 mm. Practically, balls of various sizes are beforehand prepared, and one of them is selected to use as the ball 3 according to the desired handwriting width. Examples of the diameters of the prepared balls include: 0.3 mm, 0.4 mm, 0.5 mm, 0.7 mm, 1.0 mm, 1.2 mm, and 1.6 mm.

Further, the ball 3 has a surface whose arithmetic average roughness (Ra) is preferably 0.1 to 12 nm. If the arithmetic average roughness (Ra) is less than 0.1 nm, it is difficult for the surface to catch the ink and, as a result, deep-colored handwriting is often hard to obtain when the ballpoint pen is used to write with and moreover the handwriting often suffers from blurring and/or line-skipping. On the other hand, if the arithmetic average roughness (Ra) is more than 12 nm, the ball surface is so rough that rotation resistance between the ball and the ball seat increases. The increase of rotation resistance tends to promote wear of the ball seat and to impair the writing feeling, and further often induces blurring, line-skipping, line unevenness and the like to deteriorate the writing performance. The arithmetic average roughness (Ra) is more preferably 0.1 to 10 nm. That is because, if the roughness (Ra) is within that range, the writing feeling is improved and the ink is easily caught on the ball surface. More considering the writing feeling, the roughness (Ra) is preferably 2 to 8 nm. The arithmetic average roughness (Ra) of the ball surface can be obtained from a roughness curve measured with a surface roughness measuring instrument (SPI 3800N [trademark], manufactured by SEIKO EPSON CORPORATION). Specifically, the roughness curve of a standard length is sampled in the average line direction, and the absolute values of the deviation of the roughness curve from the average line in the sampled range are totaled and averaged to obtain the arithmetic average roughness (Ra).

There are no particular restrictions on the material of the ballpoint tip body, and for example it can be made of various single metals, alloys, ceramics or resins. Specifically, it is possible to use single metals, such as, steel, copper, aluminum, and nickel; and alloys, such as, nickel silver and stainless steel. Among them, the tip body is preferably made of nickel silver because that material can improve the writing feeling and has high processability such as machinability. The tip body is also preferably made of stainless steel because a stainless steel-made tip body can inhibit the ball seat from wearing and can realize a high temporal stability. It is particularly preferred to adopt ferritic stainless steel.

In the ballpoint tip, the movable range (clearance) of the ball in the longitudinal direction is preferably 3 to 30 μm. If it is too small, writing troubles such as blurring in handwriting, teardrop dripping and point unevenness may be induced and the writing feeling may be impaired. If it is too large, teardrop dripping, ink followability and inhibition of ink leaking may be adversely affected. The movable range is more preferably 3 to 25 μm, more preferably 5 to 25 μm, and particularly preferably 7 to 20 μm in consideration of drying tendency of handwriting, ink followability, and blurring in handwriting.

In the present invention, the movable range of the ball in the longitudinal direction is based on the assumption that the ballpoint tip is in the initial condition before the ballpoint pen is begun to use for making handwriting.

The ink consumption of the ballpoint pen is preferably 20 to 150 mg per 100 m. If the consumption is less than 20 mg per 100 m, blurring and point unevenness in handwriting may be induced and it is often difficult to obtain good writing feeling. If it is more than 150 mg per 100 m, the ink followability may be adversely affected and the ink often leaks from between the ball and the tip end. In addition, the drying tendency of handwriting may be adversely affected and teardrop dripping often occurs. In view of that, the ink consumption of the ballpoint pen is more preferably 25 to 140 mg, further preferably 30 to 130 mg, furthermore preferably 40 to 110 mg per 100 m.

The ink consumption is determined by the spiral writing test carried out on five sample ballpoint pens under the conditions of:

temperature: 20° C.,
writing paper: JIS P3201,
writing angle: 70°,
writing load: 200 g, and
writing speed: 4 m/second.

With respect to each sample ballpoint pen, how much ink is consumed per 100 m is measured. The results are averaged and the averaged value is defined as the ink consumption per 100 m.

In order to obtain deep-colored handwriting and to improve the writing feeling, the ink followability and the ink leakage inhibition, it is effective to consider not only the ink consumption alone but also the relation between the ink consumption and the ball diameter. Specifically, if the ratio of the ball diameter (mm) to the ink consumption (mg) per 100 m (i.e., the ratio of ball diameter:ink consumption) is set to be 1:40 to 1:140, the oil-based ballpoint pen tends to give deep-colored handwriting and to be improved in the writing feeling, in the ink followability, in the ink leakage inhibition and in the drying tendency of handwriting. The ratio of ball diameter:ink consumption is more preferably 1:50 to 1:130, further preferably 1:60 to 1:120.

Since the oil-based ballpoint pen ink composition of the present invention contains a polyoxyalkylene glyceryl ether, the ball seat can be inhibited from wearing away and hence the ink consumption can be kept stable from the start to the end of writing. For that reason, it is easy to realize good writing feeling, to avoid blurring of handwriting and to obtain deep-colored handwriting. Since favorable writing performance tends to be thus stably obtained, the ink composition of the present invention is preferred. Specifically, the ink consumption E (mg) from the initial 0 m to the 100 m used and the ink consumption F (mg) from the 100 m before the ink is exhausted to the ink exhaustion are compared. The ratio of the ink consumption E (mg) during the initial 0 to 100 m to that F (mg) during the final 100 m (E:F) is preferably 1:0.7 to 1:1.3. That is because, if the ratio is in that range, it is easy to realize good writing feeling and to avoid blurring of handwriting and therefore favorable writing performance tends to be stably obtained. The ratio of E:F is more preferably 1:0.8 to 1:1.2, further preferably 1:0.9 to 1:1.1.

EXAMPLES

The present invention is explained by use of the following examples.

The oil-based ballpoint pen ink composition in Example 1 was prepared in the following manner. An organic solvent, a pigment and a pigment dispersant were beforehand mixed with a three-roll disperser to obtain a pigment dispersion. Subsequently, pre-determined amounts of the pigment dispersion, a dye, the organic solvent, a polyoxyalkylene glyceryl ether, a nonionic surfactant, polyvinylpyrrolidone and polyvinyl butyral resin were weighed out, heated at 60° C. and then completely dissolved with a dispersing stirrer, to obtain the oil-based ink composition for ballpoint pens. Concrete blending amounts are described later.

The ink viscosity of Example 1 was measured with a viscometer (viscometers RVDII+Pro and CP-52 spindle [trademark], manufactured by Brookfield) at 20° C. at a shear velocity of 5 $sec^{-1}$ (rotation speed: 2.5 rpm), and found to be 3000 mPa·s.

Example 1

| | |
|---|---|
| Pigment dispersion (carbon black, mean particle size: 150 nm, content of pigment content: 20%, content of polyvinyl butyral: 20%) | 50.0 mass % |
| Alcohol solvent (benzyl alcohol) | 26.5 mass % |
| Polyoxyalkylene glyceryl ether (formula (1), polyoxy-propylene glyceryl ether) | 20.0 mass % |
| Nonionic surfactant (sorbitan fatty acid ester) | 2.0 mass % |
| Polyvinylpyrrolidone | 0.5 mass % |
| Polyvinyl butyral resin | 1.0 mass % |

Examples 2 to 34

The procedure of Example 1 was repeated except that the ingredients were changed into those shown in the following tables, to prepare oil-based ballpoint pen ink compositions of Examples 2 to 34. In Examples 18, 22, and 28 to 34, the arithmetic average roughness of the ball surface and/or the movable range of the ball in the longitudinal direction were changed. The results of the evaluations are shown in the tables.

Comparative Examples 1 to 3

The procedure of Example 1 was repeated except that the ingredients were changed into those shown in the following tables, to prepare oil-based ballpoint pen ink compositions of Comparative examples 1 to 3. The results of the evaluations are shown in the tables.

In the same manner as that of Example 1, the ink viscosities of Examples 3, 21, 25 and 31 were measured at 20° C. at a shear velocity of 5 $sec^{-1}$ (rotation speed: 2.5 rpm), and found to be 2000 mPa·s, 2800 mP·s, 4800 mPa·s and 3000 mPa·s, respectively.

TABLE 1

| | | | Examples/Comparative examples Examples | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| colorant | 1 | pigment dispersion (carbon black, mean particle size: 150 nm) | 50.0 | 50.0 | 50.0 | 50.0 | 50.0 | 50.0 | 50.0 | 50.0 | 50.0 | 50.0 | 50.0 | 50.0 |
| | 2 | pigment dispersion (diketopyrrolopyrrole pigment, mean particle size: 250 nm) | | | | | | | | | | | | |
| | 3 | salt dye of basic dye and alkylbenzene sulfonic acid | | | | | | | | | | | | |
| alcohol solvent | | benzyl alcohol | 26.5 | 41.5 | 36.5 | 16.5 | 26.5 | 26.5 | 26.5 | 26.5 | 26.5 | 26.5 | 26.5 | 26.5 |
| glycol ether solvent | | ethylene glycol monophenyl ether | | | | | | | | | | | | |

TABLE 1-continued

| | | | Examples/Comparative examples Examples | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| polyoxyalkylene glyceryl ether | 4 | polyoxypropylene glyceryl ether (formula (1)) (weight average molecular weight 750) | 20.0 | 5.0 | 10.0 | 30.0 | | | | | 20.0 | 20.0 | 20.0 | 20.0 |
| | 5 | polyoxypropylene glyceryl ether (formula (1)) (weight average molecular weight 400) | | | | | 20.0 | | | | | | | |
| | 6 | polyoxypropylene glyceryl ether (formula (1)) (weight average molecular weight 1000) | | | | | | 20.0 | | | | | | |
| | 7 | polyoxypropylene glyceryl ether (formula (1)) (weight average molecular weight 1600) | | | | | | | 20.0 | | | | | |
| | 8 | polyoxyethylene diglyceryl ether (formula (2)) (weight average molecular weight 350) | | | | | | | | 20.0 | | | | |
| nonionic surfactant | 9 | sorbitan fatty acid ester (HLB: 4.3 sorbitan monooleate) | 2.0 | 2.0 | 2.0 | 2.0 | 2.0 | 2.0 | 2.0 | 2.0 | | | | |
| | 10 | polyoxyethylene sorbitan fatty acid ester (HLB: 10.5 poly-oxyethylene sorbitan tristearate) | | | | | | | | | 2.0 | | | |
| | 11 | sorbitan fatty acid ester (HLB: 6.7 sorbitan monopalmitate) | | | | | | | | | | 2.0 | | |
| | 12 | polyglycerin fatty acid ester (HLB: 4.5 hexaglycerin pentaester) | | | | | | | | | | | 2.0 | |
| | 13 | alkyl imidazoline | | | | | | | | | | | | 2.0 |
| | 14 | polyalkylene alkyl ether (HLB: 14.8 polyoxyethylene tridecyl ether) | | | | | | | | | | | | |
| phosphate ester surfactant | 15 | phosphate ester surfactant (HLB: 8.6, acid value: 80~90(mgKOH/g), number of carbon atoms in alkyl group: 18) | | | | | | | | | | | | |
| | 15 | phosphate ester surfactant (HLB: 13.3, acid value: 55~75(mgKOH/g), number of carbon atoms in alkyl group: 13) | | | | | | | | | | | | |
| | 16 | phosphate ester surfactant (HLB: 16.2, acid value: 44~58(mgKOH/g), number of carbon atoms in alkyl group: 12) | | | | | | | | | | | | |
| | 16 | phosphate ester surfactant (acid value: 135~155(mgKOH/g), number of carbon atoms in alkyl group: mixture of 12 and 13) | | | | | | | | | | | | |
| fatty acid | | oleic acid | | | | | | | | | | | | |
| organic amine | 17 | alkyl amine (total amine value: 254~265(mgKOH/g)) | | | | | | | | | | | | |
| | 18 | ethylene oxide-containing amine (total amine value: 232~246 (mgKOH/g)) | | | | | | | | | | | | |
| agent for imparting ropiness | 19 | polyvinylpyrrolidone | 0.5 | 0.5 | 0.5 | 0.5 | 0.5 | 0.5 | 0.5 | 0.5 | 0.5 | 0.5 | 0.5 | 0.5 |
| resin | 20 | polyvinyl butyral resin (amount of hydroxy groups: 36 mol %, average polymerization degree: 300) | 1.0 | 1.0 | 1.0 | 1.0 | 1.0 | 1.0 | 1.0 | 1.0 | 1.0 | 1.0 | 1.0 | 1.0 |
| | 20 | polyvinyl butyral resin (amount of hydroxy groups: 30 mol %, average polymerization degree: 1300) | | | | | | | | | | | | |
| | 21 | ketone resin | | | | | | | | | | | | |
| polyoxyalkylene glyceryl ether/surfactant | | | 10.0 | 2.5 | 5.0 | 15.0 | 10.0 | 10.0 | 10.0 | 10.0 | 10.0 | 10.0 | 10.0 | 10.0 |
| arithmetic average roughness (Ra) of ball surface (nm) | | | 7 | 7 | 7 | 7 | 7 | 7 | 7 | 7 | 7 | 7 | 7 | 7 |
| movable range of ball in longitudinal direction in ballpoint tip(μm) | | | 12 | 12 | 12 | 12 | 12 | 12 | 12 | 12 | 12 | 12 | 12 | 12 |
| evaluation | | wear resistance test | A | B | A | A | A | A | A | A | A | B | A | A |
| | | writing feeling | A | A | A | A | A | A | A | A | A | A | A | A |
| | | test for writing performance at beginning of handwriting | A | A | A | A | A | A | A | A | A | A | A | A |

TABLE 1-continued

| | Examples/Comparative examples Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| test for temporal stability of ink | A | A | A | B | B | A | B | B | A | A | A | A |
| test for ink followability | A | B | A | A | A | A | A | A | A | A | A | A |
| water resistant test | A | A | A | A | A | A | A | A | A | A | A | A |
| light stability test | A | A | A | A | A | A | A | A | A | A | A | A |

TABLE 2

| | | | Examples/Comparative examples Examples | | | | | | | | | | | |
|---|---|---|---|---|---|---|---|---|---|---|---|---|---|---|
| | | | 13 | 14 | 15 | 16 | 17 | 18 | 19 | 20 | 21 | 22 | 23 | 24 |
| colorant | 1 | pigment dispersion (carbon black, mean particle size: 150 nm) | 50.0 | 50.0 | 50.0 | 50.0 | 50.0 | | 15.0 | 50.0 | | | | |
| | 2 | pigment dispersion (diketopyrrolopyrrole pigment, mean particle size: 250 nm) | | | | | | | | | 50.0 | 50.0 | 50.0 | 50.0 |
| | 3 | salt dye of basic dye and alkylbenzene sulfonic acid | | | | | | 10.0 | 8.0 | 1.0 | | | | |
| alcohol solvent | | benzyl alcohol | 26.5 | 31.5 | 17.5 | 24.5 | 25.5 | 56.5 | 41.0 | 25.5 | 25.5 | 25.0 | 23.5 | 34.5 |
| glycol ether solvent | | ethylene glycol monophenyl ether | | | | | | 10.0 | 10.0 | | | | | |
| polyoxyalkylene glyceryl ether | 4 | polyoxypropylene glyceryl ether (formula (1)) (weight average molecular weight 750) | 20.0 | 15.0 | 20.0 | 20.0 | 20.0 | 20.0 | 20.0 | 20.0 | 20.0 | 20.0 | 20.0 | 10.0 |
| | 5 | polyoxypropylene glyceryl ether (formula (1)) (weight average molecular weight 400) | | | | | | | | | | | | |
| | 6 | polyoxypropylene glyceryl ether (formula (1)) (weight average molecular weight 1000) | | | | | | | | | | | | |
| | 7 | polyoxypropylene glyceryl ether (formula (1)) (weight average molecular weight 1600) | | | | | | | | | | | | |
| | 8 | polyoxyethylene diglyceryl ether (formula (2)) (weight average molecular weight 350) | | | | | | | | | | | | |
| nonionic surfactant | 9 | sorbitan fatty acid ester (HLB: 4.3 sorbitan monooleate) | | 2.0 | 2.0 | | | 2.0 | 4.5 | 2.0 | | 0.5 | | 1.0 |
| | 10 | polyoxyethylene sorbitan fatty acid ester (HLB: 10.5 polyoxyethylene sorbitan tristearate) | | | | | | | | | | | | |
| | 11 | sorbitan fatty acid ester (HLB: 6.7 sorbitan monopalmitate) | | | | | | | | | | | | |
| | 12 | polyglycerin fatty acid ester (HLB: 4.5 hexaglycerin pentaester) | | | | | | | | | | | | |
| | 13 | alkyl imidazoline | | | | | | | | | | | | |
| | 14 | polyalkylene alkyl ether (HLB: 14.8 polyoxyethylene tridecyl ether) | 2.0 | | | | | | | | | | | |
| phosphate ester surfactant | 15 | phosphate ester surfactant (HLB: 8.6, acid value: 80~90(mgKOH/g), number of carbon atoms in alkyl group: 18) | | | | 2.0 | | | | | | | | |
| | 15 | phosphate ester surfactant (HLB: 13.3, acid value: 55~75(mgKOH/g), number of carbon toms in alkyl group: 13) | | | | | 2.0 | | | | | | | |
| | 16 | phosphate ester surfactant (HLB: 16.2, acid value: 44~58(mgKOH/g), number of carbon atoms in alkyl group:12) | | | | | | | | | 1.0 | 1.0 | | 1.0 |
| | 16 | phosphate ester surfactant (acid value: 135~155(mgKOH/g), number of carbon atoms in alkyl group: mixture of 12 and 13) | | | | | | | | | | | 3.0 | |

TABLE 2-continued

| | | | Examples/Comparative examples Examples | | | | | | | | | | | |
|---|---|---|---|---|---|---|---|---|---|---|---|---|---|---|
| | | | 13 | 14 | 15 | 16 | 17 | 18 | 19 | 20 | 21 | 22 | 23 | 24 |
| fatty acid | | oleic acid | | | | | | | | | | | | |
| organic amine | 17 | alkyl amine (total amine value: 254~265(mgKOH/g)) | | | | 2.0 | 1.0 | | | | | | | |
| | 18 | ethylene oxide-containing amine (total amine value: 232~246 (mgKOH/g)) | | | | | | | | | 2.0 | 2.0 | 2.0 | 2.0 |
| agent for imparting ropiness | 19 | polyvinylpyrrolidone | 0.5 | 0.5 | 0.5 | 0.5 | 0.5 | 0.5 | 0.5 | 0.5 | 0.5 | 0.5 | 0.5 | 0.5 |
| resin | 20 | polyvinyl butyral resin (amount of hydroxy groups: 36 mol %, average polymerization degree: 300) | 1.0 | | | 1.0 | 1.0 | 1.0 | 1.0 | 1.0 | 1.0 | 1.0 | 1.0 | 1.0 |
| | 20 | polyvinyl butyral resin (amount of hydroxy groups: 30 mol %, average polymerization degree: 1300) | | 1.0 | | | | | | | | | | |
| | 21 | ketone resin | | | 10.0 | | | | | | | | | |
| polyoxyalkylene glyceryl ether/surfactant | | | 10.0 | 7.5 | 10.0 | 10.0 | 10.0 | 10.0 | 4.4 | 10.0 | 20.0 | 13.3 | 6.7 | 5.0 |
| arithmetic average roughness (Ra) of ball surface (nm) | | | 7 | 7 | 7 | 7 | 7 | 3 | 7 | 7 | 7 | 7 | 7 | 7 |
| movable range of ball in longitudinal direction in ballpoint tip(μm) | | | 12 | 12 | 12 | 12 | 12 | 12 | 12 | 12 | 12 | 10 | 12 | 12 |
| evaluation | | wear resistance test | B | A | A | A | A | A | A | A | A | A | A | A |
| | | writing feeling | B | B | B | A | A | A | A | A | A | A | A | A |
| | | test tor writing performance at beginning of handwriting | B | A | A | A | A | A | A | A | A | A | A | A |
| | | test for temporal stability of ink | A | B | A | C | C | A | A | A | B | A | B | A |
| | | test for ink followability | A | A | B | A | A | A | A | A | A | A | A | A |
| | | water resistant test | A | A | A | A | A | B | B | A | A | A | A | A |
| | | light stability test | A | A | A | A | A | B | B | A | A | A | A | A |

TABLE 3

| | | | Examples/Comparative examples Examples | | | | | | |
|---|---|---|---|---|---|---|---|---|---|
| | | | 25 | 26 | 27 | 28 | 29 | 30 | 31 |
| colorant | 1 | pigment dispersion (carbon black, mean particle size: 150 nm) | 50.0 | 50.0 | | 50.0 | 50.0 | 50.0 | 50.0 |
| | 2 | pigment dispersion (diketopyrrolopyrrole pigment, mean particle size: 250 nm) | | | 50.0 | | | | |
| | 3 | salt dye of basic dye and alkylbenzene sulfonic acid | | | | | | | |
| alcohol solvent | | benzyl alcohol | 22.5 | 25.5 | 26.5 | 26.5 | 26.5 | 26.5 | 26.5 |
| glycol ether solvent | | ethylene glycol monophenyl ether | | | | | | | |
| polyoxyalkylene glyceryl ether | 4 | polyoxypropylene glyceryl ether (formula (1)) (weight average molecular weight 750) | 20.0 | 20.0 | 20.0 | 20.0 | 20.0 | 20.0 | 20.0 |
| | 5 | polyoxypropylene glyceryl ether (formula (1)) (weight average molecular weight 400) | | | | | | | |
| | 6 | polyoxypropylene glyceryl ether (formula (1)) (weight average molecular weight 1000) | | | | | | | |
| | 7 | polyoxypropylene glyceryl ether (formula (1)) (weight average molecular weight 1600) | | | | | | | |
| | 8 | polyoxyethylene diglyceryl ether (formula (2)) (weight average molecular weight 350) | | | | | | | |
| nonionic surfactant | 9 | sorbitan fatty acid ester (HLB: 4.3 sorbitan monooleate) | 2.0 | | | 2.0 | 2.0 | 2.0 | 2.0 |
| | 10 | polyoxyethylene sorbitan fatty acid ester (HLB: 10.5 polyoxyethylene sorbitan tristearate) | | | | | | | |
| | 11 | sorbitan fatty acid ester (HLB: 6.7 sorbitan monopalmitate) | | | | | | | |
| | 12 | polyglycerin fatty acid ester (HLB: 4.5 hexaglycerin pentaester) | | | | | | | |
| | 13 | alkyl imidazoline | | | | | | | |
| | 14 | polyalkylene alkyl ether (HLB: 14.8 polyoxyethylene tridecyl ether) | | | | | | | |

TABLE 3-continued

| | | | | | | | | | |
|---|---|---|---|---|---|---|---|---|---|
| phosphate ester surfactant | 15 | phosphate ester surfactant (HLB: 8.6, acid value: 80~90(mgKOH/g), number of carbon atoms in alkyl group: 18) | | 1.0 | | | | | |
| | 15 | phosphate ester surfactant (HLB: 13.3, acid value: 55~75(mgKOH/g), number of carbon toms in alkyl group: 13) | | | | | | | |
| | 16 | phosphate ester surfactant (HLB: 16.2, acid value: 44~58(mgKOH/g), number of carbon atoms in alkyl group: 12) | | | | | | | |
| | 16 | phosphate ester surfactant (acid value: 135~155(mgKOH/g), number of carbon atoms in alkyl group: mixture of 12 and 13) | | | | | | | |
| fatty acid | | oleic acid | | | 2.0 | | | | |
| organic amine | 17 | alkyl amine (total amine value: 254~265 (mgKOH/g)) | | 2.0 | | | | | |
| | 18 | ethylene oxide-containing amine (total amine value: 232~246 (mgKOH/g)) | | | | | | | |
| agent for imparting ropiness | 19 | polyvinylpyrrolidone | 0.5 | 0.5 | 0.5 | 0.5 | 0.5 | 0.5 | 0.5 |
| resin | 20 | polyvinyl butyral resin (amount of hydroxy groups: 36 mol %, average polymerization degree: 300) | 5.0 | 1.0 | 1.0 | 1.0 | 1.0 | 1.0 | 1.0 |
| | 20 | polyvinyl butyral resin (amount of hydroxy groups: 30 mol %, average polymerization degree: 1300) | | | | | | | |
| | 21 | ketone resin | | | | | | | |
| polyoxyalkylene glyceryl ether/surfactant | | | 10.0 | 20.0 | 10.0 | 10.0 | 10.0 | 10.0 | 10.0 |
| arithmetic average roughness (Ra) of ball surface (nm) | | | 7 | 7 | 7 | 2 | 10 | 7 | 7 |
| movable range of ball in longitudinal direction in ballpoint tip(μm) | | | 12 | 12 | 12 | 12 | 12 | 7 | 20 |
| evaluation | | wear resistance test | A | A | B | A | B | A | A |
| | | writing feeling | A | A | B | A | B | A | A |
| | | test for writing performance at beginning of handwriting | A | A | B | A | A | A | A |
| | | test for temporal stability of ink | A | C | B | A | A | A | A |
| | | test for ink followability | A | A | A | A | A | A | A |
| | | water resistant test | A | A | A | A | A | A | A |
| | | light stability test | A | A | A | A | A | A | A |

| | | | Examples/Comparative examples | | | | | |
|---|---|---|---|---|---|---|---|---|
| | | | Examples | | | Comparative examples | | |
| | | | 32 | 33 | 34 | 1 | 2 | 3 |
| colorant | 1 | pigment dispersion (carbon black, mean particle size: 150 nm) | 50.0 | 50.0 | 50.0 | 50.0 | 50.0 | 50.0 |
| | 2 | pigment dispersion (diketopyrrolopyrrole pigment, mean particle size: 250 nm) | | | | | | |
| | 3 | salt dye of basic dye and alkylbenzene sulfonic acid | | | | 2.0 | 2.0 | 2.0 |
| alcohol solvent | | benzyl alcohol | 26.5 | 26.5 | 27.7 | 44.5 | 46.5 | 42.5 |
| glycol ether solvent | | ethylene glycol monophenyl ether | | | | | | |
| polyoxyalkylene glyceryl ether | 4 | polyoxypropylene glyceryl ether (formula (1)) (weight average molecular weight 750) | 20.0 | 20.0 | 20.0 | | | |
| | 5 | polyoxypropylene glyceryl ether (formula (1)) (weight average molecular weight 400) | | | | | | |
| | 6 | polyoxypropylene glyceryl ether (formula (1)) (weight average molecular weight 1000) | | | | | | |
| | 7 | polyoxypropylene glyceryl ether (formula (1)) (weight average molecular weight 1600) | | | | | | |
| | 8 | polyoxyethylene diglyceryl ether (formula (2)) (weight average molecular weight 350) | | | | | | |
| nonionic surfactant | 9 | sorbitan fatty acid ester (HLB: 4.3 sorbitan monooleate) | 2.0 | 2.0 | | 2.0 | | |
| | 10 | polyoxyethylene sorbitan fatty acid ester (HLB: 10.5 polyoxyethylene sorbitan tristearate) | | | | | | |
| | 11 | sorbitan fatty acid ester (HLB: 6.7 sorbitan monopalmitate) | | | | | | |
| | 12 | polyglycerin fatty acid ester (HLB: 4.5 hexaglycerin pentaester) | | | 0.8 | | | |
| | 13 | alkyl imidazoline | | | | | | |
| | 14 | polyalkylene alkyl ether (HLB: 14.8 polyoxyethylene tridecyl ether) | | | | | | |

TABLE 3-continued

| | | | | | | | | |
|---|---|---|---|---|---|---|---|---|
| phosphate ester surfactant | 15 | phosphate ester surfactant (HLB: 8.6, acid value: 80~90(mgKOH/g), number of carbon atoms in alkyl group: 18) | | | | | | 2.0 |
| | 15 | phosphate ester surfactant (HLB: 13.3, acid value: 55~75(mgKOH/g), number of carbon toms in alkyl group: 13) | | | | | | |
| | 16 | phosphate ester surfactant (HLB: 16.2, acid value: 44~58(mgKOH/g), number of carbon atoms in alkyl group: 12) | | | | | | |
| | 16 | phosphate ester surfactant (acid value: 135~155(mgKOH/g), number of carbon atoms in alkyl group: mixture of 12 and 13) | | | | | | |
| fatty acid | | oleic acid | | | | | | |
| organic amine | 17 | alkyl amine (total amine value: 254~265 (mgKOH/g)) | | | | | | |
| | 18 | ethylene oxide-containing amine (total amine value: 232~246 (mgKOH/g)) | | | | | | 2.0 |
| agent for imparting ropiness | 19 | polyvinylpyrrolidone | 0.5 | 0.5 | 0.5 | 0.5 | 0.5 | 0.5 |
| resin | 20 | polyvinyl butyral resin (amount of hydroxy groups: 36 mol %, average polymerization degree: 300) | 1.0 | 1.0 | 1.0 | 1.0 | 1.0 | 1.0 |
| | 20 | polyvinyl butyral resin (amount of hydroxy groups: 30 mol %, average polymerization degree: 1300) | | | | | | |
| | 21 | ketone resin | | | | | | |
| polyoxyalkylene glyceryl ether/surfactant | | | 10.0 | 10.0 | 25.0 | — | — | — |
| arithmetic average roughness (Ra) of ball surface (nm) | | | 7 | 15 | 17 | 7 | 7 | 7 |
| movable range of ball in longitudinal direction in ballpoint tip(μm) | | | 25 | 12 | 12 | 12 | 12 | 12 |
| evaluation | | wear resistance test | A | B | C | D | D | D |
| | | writing feeling | A | C | C | B | C | B |
| | | test for writing performance at beginning of handwriting | A | A | A | A | D | C |
| | | test for temporal stability of ink | A | A | A | A | A | C |
| | | test for ink followability | B | B | B | D | D | C |
| | | water resistant test | A | A | A | A | A | A |
| | | light stability test | A | A | A | A | A | A |

1. manufactured by Fuji Pigment Co., Ltd.; carbon black, mean particle size: 150 nm, content of the pigment: 20%, content of polyvinyl butyral resin: 20%;
2. manufactured by Fuji Pigment Co., Ltd.; diketo-pyrrolopyrrole pigment, mean particle size: 250 nm, content of the pigment: 20%, content of polyvinyl butyral resin: 20%;
3. manufactured by ORIENT CHEMICAL INDUSTRIES CO., LTD.;
4. manufactured by Sakamoto Yakuhin Kogyo Co., Ltd.; SC-P750 [trademark], average molar number of added propylene oxide (m+n+o+p): 9, solubility parameter (SP value): 22.7;
5. manufactured by Sakamoto Yakuhin Kogyo Co., Ltd.; SC-P400 [trademark], average molar number of added propylene oxide (m+n+o+p): 4, solubility parameter (SP value): 26.1;
6. manufactured by Sakamoto Yakuhin Kogyo Co., Ltd.; SC-P1000 [trademark], average molar number of added propylene oxide (m+n+o+p): 14;
7. manufactured by Sakamoto Yakuhin Kogyo Co., Ltd.; SC-P1600 [trademark], average molar number of added propylene oxide (m+n+o+p): 24;
8. manufactured by Sakamoto Yakuhin Kogyo Co., Ltd.; SC-E2000 [trademark], average molar number of added ethylene oxide (w+x+y+z): 4, solubility parameter (SP value): 21.0;
9. manufactured by DKS Co. Ltd.; SORGEN 40 [trademark], number of carbon atoms in alkyl group: 18;
10. manufactured by Kao Corporation; RHEODOL TW-S320V [trademark], number of carbon atoms in alkyl group: 18;
11. manufactured by Kao Corporation; RHEODOL SP-P10 [trademark], number of carbon atoms in alkyl group: 16;
12. manufactured by Sakamoto Yakuhin Kogyo Co., Ltd.; PS-5S [trademark];
13. manufactured by Kao Corporation;
14. manufactured by DKS Co. Ltd.; NOIGEN TDS-120 [trademark];
15. manufactured by TOHO Chemical Industry Co., Ltd.; Phosphanol [trademark] series;
16. manufactured by DKS Co. Ltd.; PLYSURF [trademark] series;
17. manufactured by Kao Corporation; FARMIN DM2098 [trademark], tertiary amine;
18. manufactured by NOF CORPORATION; NYMEEN [trademark], secondary amine;
19. manufactured by IBS JAPAN CO., LTD.; PVP K-90 [trademark];
20. manufactured by SEKISUI CHEMICAL Co., Ltd.;
21. manufactured by Hitachi Chemical Company, Ltd.;

Tests and Evaluations

A ballpoint tip (made of ferritic stainless steel) which rotatably held a ball was fitted in the tip-side end of an ink storage cylinder (made of polypropylene). The ball was made of cemented carbide containing tungsten carbide as the main ingredient and cobalt as the binder ingredient, and had a diameter Φ of 0.7 mm and a surface whose arithmetic average roughness (Ra) was 7 nm. In the ballpoint tip, a coil spring was provided for directly pressing the ball against the inner wall of the tip end and the movable range of the ball in the longitudinal direction was 12 μm. The oil-based ballpoint pen ink of Example 1 (0.2 g) was then directly put into the ink storage cylinder, to prepare a refill. Subsequently, the refill was installed in an oil-based ballpoint pen (supergrip [trademark], manufactured by PILOT Corporation), which was subjected to the following tests and thereby evaluated. In the writing test, writing paper according to JIS P3201 was adopted. With respect to each of the oil-based ballpoint pen ink compositions of Examples 1 to 34 and Comparative examples 1 to 3, the same procedure was repeated.

Each of the ink compositions of Examples 1, 3, 21, 25 and 31 was put into the oil-based ballpoint pen, and subjected to the spiral writing test. As a result, it was found that the ink consumptions during the initial 100 m were 70 mg/100 m, 75 mg/100 m, 60 mg/100 m, 50 mg/100 m and 98 mg/100 m, respectively.

Further, the ratios of the ball diameters (mm) to the ink consumptions (mg) during the initial 100 m (ratio of ball diameter: ink consumption) were found to be 1:100, 1:107, 1:86, 1:71 and 1:140, respectively.

Furthermore, with respect to each of the oil-based ballpoint pens containing the ink compositions of Examples 1, 3, 21, 25 and 31, the ink consumption ratios E: F, in which E and F means the ink consumption (E mg) from the initial 0 m to the 100 m used and that (F mg) from the 100 m before the ink is exhausted to the ink exhaustion, were found to be 70:73 (1:1.04), 75:72 (1:0.96), 60:65 (1:1.08), 50:46 (1:0.9) and 98:101 (1:1.03), respectively.

Wear Resistance Test (Wearing Test of Ball Seat)

After the writing test, the ball seat was subjected to the wear resistance test with a running test apparatus of 4 m/minute under the conditions of load: 400 gf and writing angle: 70°.

A: the wearing of the ball seat was less than 5 μm,

B: the wearing of the ball seat was 5 μm or more but less than 10 μm,

C: the wearing of the ball seat was 10 μm or more but less than 20 μm, and it was possible to use the sample ballpoint pen to write with, and D: the wearing of the ball seat was so serious that it was impossible to use the sample ballpoint pen to write with.

Writing feeling, sensory evaluation test by the hand.

A: very smooth,

B: smooth,

C: smooth enough to use in practice, and

D: heavy.

Test for Writing Performance at the Beginning of Handwriting

After used to write with, the sample ballpoint pen was left with the tip end kept exposed to the air for 24 hours under the conditions of 20° C. and 65% RH. Thereafter, the sample ballpoint pen was used to draw a line by means of a running test apparatus under the following conditions, and the drawn line was observed to measure length of blur at the beginning of the line.

<Drawing Conditions> drawing load: 200 gf, drawing angle: 70°, drawing speed: 4 m/minute,

A straight line was thus drawn with a running test apparatus, and was evaluated.

A: the length of blur was less than 5 mm,

B: the length of blur was 5 mm or more but less than 10 mm,

C: the length of blur was 10 mm or more but less than 20 mm, and

D: the length of blur was 20 mm or more.

Test for Temporal Stability of Ink

After left at 50° for one month, the ink in the tip body was observed with a microscope.

A: no precipitates were observed and the ink was in a good condition,

B: some precipitates were deposited,

C: precipitates were deposited but practically allowable, and

D: precipitates were deposited to cause blurring and defects in handwriting.

Test for Ink Followability

After the sample ballpoint pen was left at 50° C. for one month, handwriting was kept written by the hand quickly and continuously for 10 seconds.

A: neither blurring nor line-skipping was observed,

B: slight blurring and/or line-skipping was observed but practically allowable,

C: blurring and/or line-skipping was observed, and

D: serious blurring and/or line-skipping was observed.

Test for Water Resistance

Spiral handwriting was written on the writing paper and dried, then immersed in water for 10 seconds, and observed to check the condition of the handwriting.

A: good condition,

B: slightly faded but recognizable,

C: unable to recognize.

Test for Light Stability

The spiral writing test was carried out on the writing paper under the conditions of: writing angle: 70°, writing load: 150 g, writing angle: 70°, and writing speed: 4.5 m/second. After left for 1 hour, the handwriting was exposed to Xenon fade meter (X15F [trademark]; manufactured by Suga Test Instruments Co., Ltd.) until the blue scale was faded by three grades. The resultant handwriting was observed.

A: not faded,

B: slightly faded but recognizable, and

C: seriously faded.

As a result, the samples of Example 1 to 34 exhibited favorable results in the wear resistance test (wearing test of ball seat), in the writing feeling, in the test for writing performance at the beginning of handwriting, in the test for temporal stability of ink, in the test of ink followability, in the test for water resistance and in the test for light stability.

In Examples 1 to 17 and 19 to 34, pigments were adopted as the colorant. They were stable and excellent in dispersibility.

Since polyoxyalkylene glyceryl ethers were not used in Comparative examples 1 to 3, they gave poor results in the wear resistance test (wearing test of ball seat) and were inferior in the test of ink followability.

The ink composition of the invention is effectively used in oil-based retractable ballpoint pens such as knock-type ones and twist-type ones because the writing performance at the beginning of handwriting is important in those ballpoint pens.

For improving the ink-leak prevention and the writing performance at the beginning of handwriting, the ink composition of the present invention is preferably used in a ballpoint tip equipped with a valve mechanism in which a ball is rotatably held at the tip end and is pressed by an elastic member (such as a coil spring) directly or through a pressing body onto the inner wall of the tip end edge so that the ink can flow out through a gap formed between the inner wall and the ball by writing pressure when the ballpoint pen is used to write with. The ballpoint pen preferably has the above mechanism because even a small gap at the tip end is preferably closed when the ballpoint pen is not used to write with.

Each oil-based ballpoint pen in the present examples comprises a cylindrical shaft tube and a refill encased therein. The refill comprises an ink storage cylinder filled with the ink composition. However, the oil-based ballpoint pen of the present invention may comprise a cylindrical shaft serving by itself as an ink storage cylinder directly filled with the oil-based ink composition. The ballpoint pen of the invention may be of such a direct-filled type. Further, an ink storage cylinder filled with the ink composition of the invention (namely, a refill filled with the ink composition of the invention) may be directly used as a ballpoint pen.

INDUSTRIAL APPLICABILITY

The present invention can be used as an oil-based ink composition for ballpoint pens. Specifically, the invention can be widely used as various types (such as cap-type and knock-type) of oil-based ballpoint pens filled with the oil-based ballpoint pen ink composition.

DESCRIPTION OF THE REFERENCE NUMERALS

1. ballpoint pen refill,
2. ink storage cylinder,
3. ball,
4. ballpoint tip,
5. tip end,
6. ball holder,
7. ink-flow port,
8. ink-flow canals,
9. ball seat,
10. oil-based ballpoint pen ink,
H. ball exposure,
α. swaging angle.

The invention claimed is:

1. An oil-based ink composition for ballpoint pens, comprising a colorant, an organic solvent, a resin, a polyoxyalkylene glyceryl ether, and a surfactant,
wherein the surfactant is at least one selected from the group consisting of a nonionic surfactant having an HLB value of 16 or less and an anionic surfactant,
the nonionic surfactant having the HLB value of 16 or less is at least one selected from the group consisting of a fatty acid ester, a polyalkylene alkyl ether, a polyoxyethylene alkyl amine, an alkyl imidazoline, and an alkyl alkanol amide,
the anionic surfactant is a phosphoric ester surfactant having an acid value of 200 mgKOH/g or less,
the polyoxyalkylene glyceryl ether is a polypropylene glyceryl ether having an average addition molar number of alkylene oxide of 1 to 50,
a content of the polyoxyalkylene glyceryl ether is 0.1 to 40 mass % based on a total mass of the oil-based ink composition,
a content of the resin is 5 to 30 mass % based on the total mass of the oil-based ink composition,
the resin comprises a polyvinyl butyral resin, and
a blending ratio by mass of the polyoxyalkylene glyceryl ether to the surfactant is 1 to 25.

2. The oil-based ink composition according to claim 1, wherein the colorant is a pigment.

3. The oil-based ink composition according to claim 1, wherein the organic solvent is an aromatic alcohol.

4. The oil-based ink composition according to claim 1, wherein the surfactant is the nonionic surfactant having the HLB value of 16 or less.

5. The oil-based ink composition according to claim 1, wherein the surfactant is the anionic surfactant.

6. The oil-based ink composition according to claim 1, wherein the surfactant is a combination of the nonionic surfactant having the HLB value of 16 or less and the anionic surfactant.

7. The oil-based ink composition according to claim 1, which has a viscosity of 30,000 mPa·s or less at 20° C. at a shear velocity of 5 $sec^{-1}$.

8. An oil-based ballpoint pen, comprising:
an ink storage cylinder and a ballpoint tip, the ballpoint tip fitted in a tip-side end of the ink storage cylinder and rotatably holding a ball,
wherein the ink storage cylinder comprises an oil-based ink composition comprising a colorant, an organic solvent, a resin, a polyoxyalkylene glyceryl ether, and a surfactant,
wherein the surfactant is at least one selected from the group consisting of a nonionic surfactant having an HLB value of 16 or less and an anionic surfactant,
the nonionic surfactant is at least one selected from the group consisting of a fatty acid ester, a polyalkylene alkyl ether, a polyoxyethylene alkyl amine, an alkyl imidazoline, and an alkyl alkanol amide,
the anionic surfactant is a phosphoric ester surfactant having an acid value of 200 mgKOH/g or less,
the polyoxyalkylene glyceryl ether is a polypropylene glyceryl ether having an average addition molar number of alkylene oxide of 1 to 50,
a content of the polyoxyalkylene glyceryl ether is 0.1 to 40 mass % based on a total mass of the oil-based ink composition,
a content of the resin is 5 to 30 mass % based on the total mass of the oil-based ink composition,
the resin comprises a polyvinyl butyral resin, and
a blending ratio by mass of the polyoxyalkylene glyceryl ether to the surfactant is 1 to 25.

9. The oil-based ballpoint pen according to claim 8, wherein the ball comprises a surface having an arithmetic average roughness (Ra) of 0.1 to 12 nm.

10. The oil-based ballpoint pen according to claim 8, which has an ink consumption per 100 m of 20 to 150 mg.

11. The oil-based ballpoint pen according to claim 8, wherein the ball rotatably held in the ballpoint tip moves in a longitudinal direction in a range of 3 to 30 μm.

12. The oil-based ink composition according to claim 1, wherein a content of the polyvinyl butyral resin is 70% or more based on a total amount of all resins.

13. The oil-based ink composition according to claim 1, wherein the polyvinyl butyral resin comprises hydroxyl groups in an amount of 25 mol % or more.

14. The oil-based ballpoint pen according to claim 8, wherein a content of the polyvinyl butyral resin is 70% or more based on a total amount of all resins.

15. The oil-based ballpoint pen according to claim 8, wherein the polyvinyl butyral resin comprises hydroxyl groups in an amount of 25 mol % or more.

* * * * *